United States Patent [19]

Visser et al.

[11] Patent Number: 5,884,980
[45] Date of Patent: Mar. 23, 1999

[54] VEHICLE BRAKE AND HUB ATTACHMENT SYSTEM AND METHOD

[75] Inventors: Monte J. Visser, Pointe Woods; P. William McCay, Ann Arbor; Stanley Kulczycki, Sterling Heights, all of Mich.

[73] Assignee: Robert Bosch Technologies Corporation, Farmington Hills, Mich.

[21] Appl. No.: 739,872

[22] Filed: Oct. 31, 1996

[51] Int. Cl.[6] ........................................... B60B 27/00
[52] U.S. Cl. ................ 301/6.1; 301/35.62; 301/105.1; 188/218 XL; 82/1.11; 409/131
[58] Field of Search .................. 301/6.1, 6.8, 35.62, 301/105.1, 111, 114, 36.1; 188/218 XL; 82/1.11, 903; 409/131, 219

[56] References Cited

U.S. PATENT DOCUMENTS

| | | |
|---|---|---|
| 1,914,575 | 6/1933 | Main ..................................... 301/35.62 |
| 1,963,229 | 6/1934 | Eksergian ......................... 301/35.62 X |
| 2,545,130 | 3/1951 | Ash ................................. 301/35.62 X |
| 2,640,729 | 6/1953 | Niven ..................................... 301/35.62 |
| 2,877,054 | 3/1959 | Hedlund et al. ...................... 301/35.62 |
| 3,117,611 | 1/1964 | Matthews . |
| 3,252,493 | 5/1966 | Smith . |
| 4,240,670 | 12/1980 | Zorn et al. ............................ 301/35.62 |
| 4,464,091 | 8/1984 | Molina . |
| 4,730,967 | 3/1988 | Warkentin . |
| 4,792,020 | 12/1988 | Okumura et al. .................... 301/6.8 X |
| 4,815,908 | 3/1989 | Duran et al. . |
| 4,906,153 | 3/1990 | Duran . |
| 5,076,747 | 12/1991 | Cosenza . |
| 5,082,299 | 1/1992 | Beattie . |
| 5,094,579 | 3/1992 | Johnson . |

*Primary Examiner*—Russell D. Stormer
*Attorney, Agent, or Firm*—Harness, Dickey & Pierce, P.L.C.

[57] ABSTRACT

A wheel end hub assembly for a motor vehicle incorporating mechanical retention features. The assembly accurately and positively orients the motor vehicle brake component, such as a disc brake rotor or brake drum with respect to its wheel hub. Accordingly, the machining operations for the brake component braking surfaces can be accurately based from a datum surface of the hub. The assembly incorporates a retention nut threaded onto the wheel mounting bolts which exerts a clamping force on the brake component and further establishes the relative positions of the hub and brake component. The retention nut features a generally conical surface which contacts a generally conical surface of the brake component to establish the radial and rotational relative position of these components.

6 Claims, 4 Drawing Sheets

VEHICLE BRAKE AND HUB ATTACHMENT SYSTEM AND METHOD

BACKGROUND AND SUMMARY OF THE INVENTION

This invention relates to motor vehicle wheel end components and particularly to a wheel hub assembly having a disc brake rotor or drum incorporating novel means for attaching components of the assembly, and for machining braking surfaces of the rotor or drum.

Most motor vehicles today include disc brake systems for the front axle and many further include disc brakes at the rear axle positions. The disc brake rotor is a circular metal disc having opposed braking surfaces that are clamped by brake pads carried by a brake caliper to exert a braking effect. The wheel hub incorporates an anti-friction wheel bearing assembly in which one race of the bearing is coupled to the vehicle suspension and the other rotationally mounts the brake rotor and wheel. Ordinarily the rotating components of the rotor and hub assembly are manufactured separately and assembled together. This enables the brake rotor to be serviced and replaced if necessary during use. Moreover, the desired material characteristics for a brake rotor and hub components are different. Although efforts to integrate these components have been proposed, such an approach has not found wide-spread acceptance.

In order to enhance performance of the braking system it is desired to carefully and accurately control the dimensional characteristics of the rotor braking surfaces as the rotor rotates. The thickness variation of the disc and the lateral run-out or lateral deflection of the surfaces as they rotate needs to be held to minimum tolerances. Similarly, the radial run-out of the outer edges of the braking surfaces need to be controlled to ensure that the brake pads engage as much of the available rotor braking surface as possible without overlapping the edges of the rotor which gives rise to brake noise problems. The desire to control lateral and radial run-out of braking surfaces of a disc rotor are well known. However, manufacturers have faced difficulties in achieving enhanced control over these tolerances due to the influence of several factors.

Presently available manufacturing methods and designs of wheel end assemblies limit the accuracy to which radial and lateral run-out of braking surfaces can be controlled. One approach presently used is to separately finish machine the rotor and wheel hub, and later mate the two. The "stack up" of tolerance variations related to such an approach is significant. This is true not only because the machining operations of the parts are done separately, but in view of the fact that tight control over the relative positioning of the hub and rotor components is not provided. Brake rotors typically have a central hole which mounts over a protruding shoulder or post of the wheel hub. A number of wheel bolts projecting from the hub pass through clearance holes in the rotor. Due to the need to provide clearance between the bolts and associated bolt holes in the rotor, the rotor is not accurately positioned with respect to the hub surface. Slight angular variations in the relative position of these two parts can negatively impact run-out characteristics. Such variations occur in at least two ways. First, the center-to-center alignment of the rotor and hub is not well controlled. Second, the relative angular position or "clocking" of the components is also variable. In addition, the forces acting on the components as they are mounted to the vehicle cannot be readily duplicated during a machining operation. Thus, differences in deflections of the components between that occurring during machining operations and during use negatively contribute to run-out accuracies.

One approach to improving upon currently available brake rotor run-out accuracies is to assemble a rotor and hub and finish machine the rotor braking surfaces. This is done by employing accurately ground or machined surfaces of the hub as a datum for finishing the rotor braking surfaces. Although an improvement over prior processing, this approach is still limited by the lack of accuracy of control and fixing of the relative angular position of the hub and rotor. In this process, sheet metal nuts, such as so called "tinnerman" nuts are often used on the wheel mounting bolts to loosely connect the hub and rotor in an assembled condition. Such fasteners are used since they are thin and do not therefore interfere with the vehicle wheel mounted against the outboard rotor face. This approach however, suffers from some of the same shortcoming of the previously described method in that the relative angular position of the components cannot be assured and clamping loads acting on the parts during use cannot be readily duplicated.

In accordance with this invention, a novel wheel end assembly and method are provided which include special fastening means for connecting the two principle components together for machining operations. The fastening approach accurately controls the relative angular position and center-to-center alignment of the two principle components and simulates wheel mounting clamping forces. This fastening approach is preferably implemented in a manufacturing process in which these components are fastened together and thereafter the brake rotor braking surfaces are machined concurrently (or consecutively) with datum surfaces on the hub. A preferred locating surface is the cylindrical outer barrel of the hub which the wheel bearing assembly later mounts to. These retention fasteners are left in position to maintain the relative positions of the components as the vehicle is driven. Through this method and component design, extreme accuracy over lateral and radial run-out of the braking surfaces is provided.

In this invention, fasteners in the form of retention nuts are threaded onto the wheel mounting bolts and engage the rotor. The rotor and retention nuts define an interface which establishes the relative angular and center-to-center alignment of the hub and rotor. In a preferred embodiment, the nuts feature tapered outer surfaces which engage generally conical counter-bored surfaces of the rotor wheel bolt clearance holes. These fasteners provide a clamping force as well as accurately positioning the relative angular position of the hub and rotor. By maintaining the components in an assembled condition after machining the relative position of the parts is maintained and thus assembly, precise control over dimensional run-outs is provided.

The features of the present invention may also be implemented in connection with a drum brake unit incorporating a brake drum and hub assembly. Implementation of the invention is carried out in the same manner as in connection with the disc brake except that the brake surface constitutes inside cylindrical surface as opposed to the planer surface of a disc brake rotor. The advantages of controlling the dimensional accuracy of the braking surfaces are however, provided and are also desirable in drum brake applications.

Further objects, features and advantages of the invention will become apparent from a consideration of the following description and the appended claims when taken in connection with the accompanying drawings.

DETAILED DESCRIPTION OF THE PREFERRED EMBODIMENTS

Figure 1:
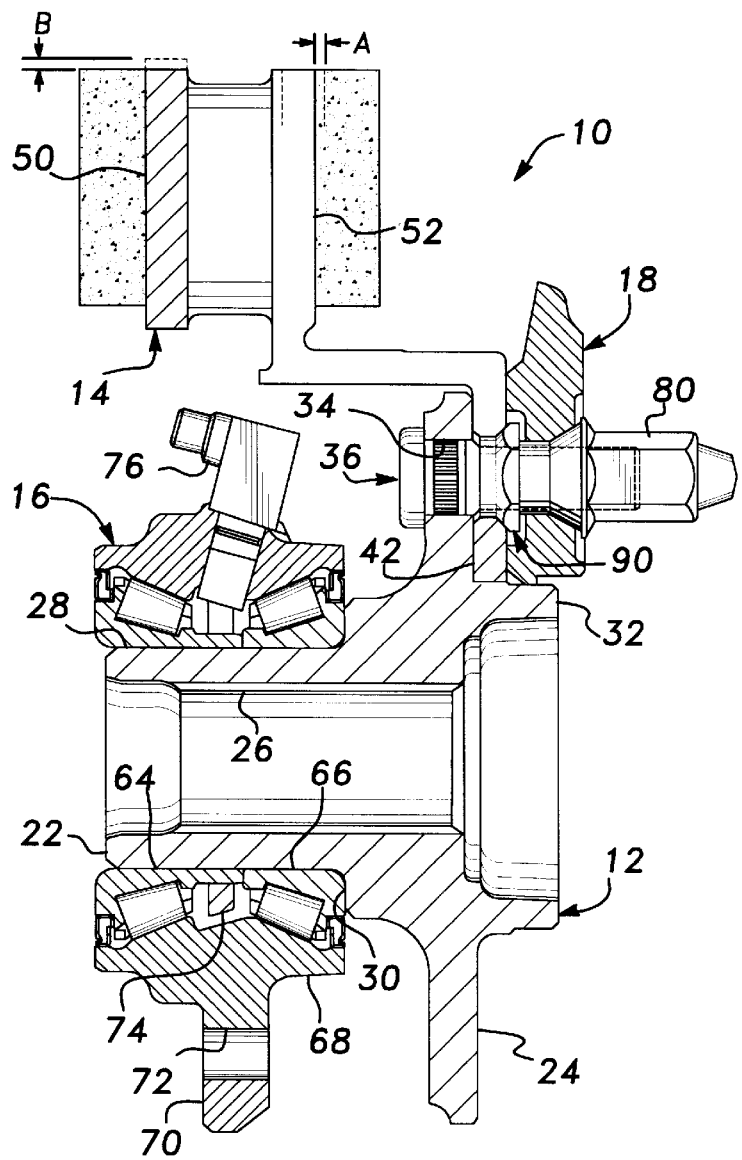
FIG. 1 is a cross-sectional view through a wheel end assembly accordingly to this invention further illustrating a portion of a wheel mounted to the assembly and a cartridge type bearing assembly pressed onto the hub.
Figure 2:
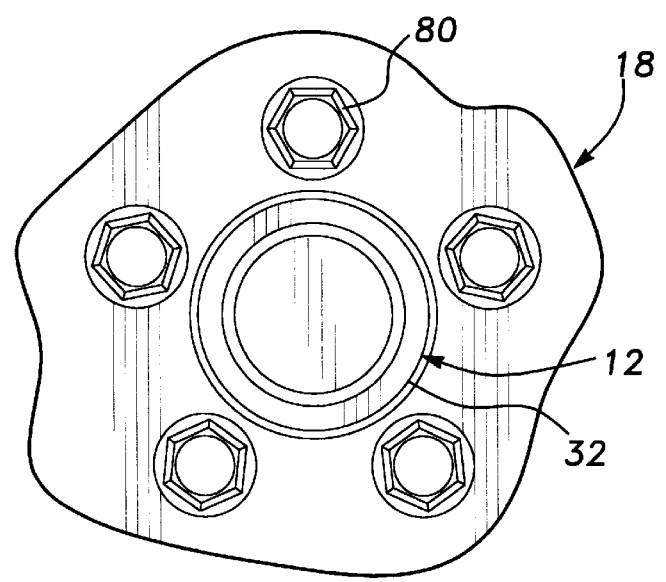
FIG. 2 is a partial front elevational view of the assembly shown in FIG. 1.
Figure 3:
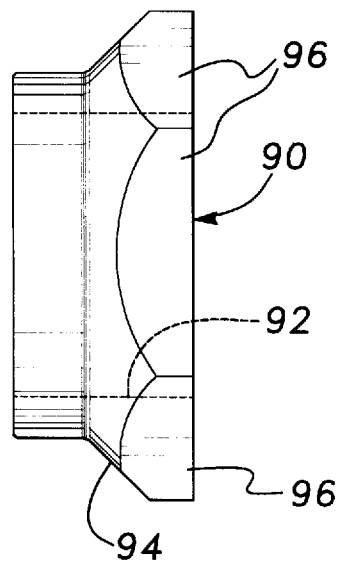
FIG. 3 is an elevational view of the retention nut according to a first embodiment shown in FIG. 1.

With reference to FIGS. 1, 2 and 3 wheel end assembly 10 according to this invention is shown which generally comprises hub 12 and brake rotor 14. FIG. 1 further illustrates cartridge type wheel bearing assembly 16 mounted to hub 12, and wheel 18 mounted against rotor 14.

Hub 12 includes a generally cylindrical barrel section 22 having a cylindrical outer diameter 28 and a radial protruding rotor mounting flange 24 which is generally circular. Through the center of hub 12 is a splined inner diameter 26. Splined inner diameter 26 receives a splined driveshaft (not shown) which drives wheel end assembly 10. The embodiment of wheel end assembly 10 shown in FIG. 1 is intended to be used with a driven and non-driven axles such as the front axle of a four wheel drive sport utility and passenger vehicles. The hub barrel section outer diameter 28 is a precision machined surface and terminates at shoulder 30. Projecting from the outboard face of hub 12 is a protruding shoulder or circular post 32. Flange 24 forms a number of wheel mounting bolt bores 34 which receive wheel mounting bolts 36.

Brake rotor 14 includes a generally circular mounting flange 42 which forms a plurality of bolt clearance holes 44 which are in registry with wheel mounting bolt bores 34. Mounting flange 42 defines an inboard surface 43 and an opposed outboard surface 45. Mounting flange 42 forms an inside diameter 46 which fits closely onto the outside diameter of hub post 32. In accordance with a principal feature of this invention, brake rotor bolt clearance holes 44 include a tapered counter bore 48 segment opening to the outboard surface 45 edges. Rotor 14 further forms a pair of opposed braking friction surfaces 50 and 52. As shown in FIG. 1, dimension A depicts the lateral run-out of braking surface 52 as it is rotated. The extreme lateral positions which the braking surface occupies in the sectional view as it is rotated provides this run-out measure and is generally measured by a dial indicator with its probe touching the braking surface as the rotor is rotated. A similar measurement can be made of braking surface 50. The radial run-out is designated by dimension B which is the extreme radial positions which braking surface 50 occupies as it is rotated and is generally measured by a dial indicator with its probe touching the outer edge of the braking surface. A similar measurement can be made of braking surface 52. As mentioned previously, a principal feature of this invention to limit to extremely small values, both of these run-out characteristics for both braking surfaces.

Hub 12 and rotor 14 are rotationally symmetrical. Each component defines a center longitudinal axis. Ideally these axes should be co-axial. This invention is directed to provide accuracy and fixation of this center-to-center alignment.

Wheel mounting bolts 36 have a head 56 and a splined or knurled section 58. Splined section 58 is dimensioned such that wheel mounting bolts 36 are press-fit into rotor bolt bores 34. The threaded section 60 of wheel mounting bolts 36 extend from splined section 58 to the terminal end of the bolts.

Cartridge wheel bearing assembly 16 includes a pair of tapered roller bearing assemblies. Inner races 64 and 66 are press-fit onto hub barrel section outside diameter 28 and race 66 abut shoulder 30. Outer race 68 is a unitary assembly that forms the outer race surfaces for both sets of tapered roller bearings and includes flange 70 and bore 72 enabling it to be mounted to a suspension component of the vehicle. Cartridge wheel bearing assembly 16 also includes toothed tone wheel 74 which provides a signal for wheel speed sensor 76 related to wheel speed. These components are used as part of a vehicle anti-lock brake system or traction control system.

Vehicle wheel 18 is shown in partial section and being mounted against rotor mounting flange 42 through tightening of lug nut 80 which threads onto the threaded portion 60 of wheel mounting bolts 36. Lug nuts 80 feature a conical shoulder 82 which engage a conical counterbore 83 of the wheel lug nut bores 84. The inboard side of the wheel surrounding wheel lug nut bores 84 includes a counter bore 86 which provides clearance for retention nut 90.

Retention nut 90 includes an internally threaded bore 92 which meshes with the threaded portion 60 of wheel mounting bolts 36, and further include a generally conical shoulder 94. In the embodiments shown in FIGS. 1 through 4, nut 90 further includes hexagonal driving surfaces 96. The cone angles or shapes formed by conical shoulder 94 and rotor tapered counterbore 48 match. It should be noted that the shapes of shoulder 94 and counterbore 48 do not have to be truly conical in shape. A variety of generally convex shapes would be useful for forming shoulder 94 and are considered within the definition of conical as used herein. Similarly, a ranges of shapes could be used for counterbore 48 which are generally concave. The nut 90 and rotor 14 thus define an interface means comprising the mating conical surfaces which provide for fixing of the alignment between these components.

Figure 3A:
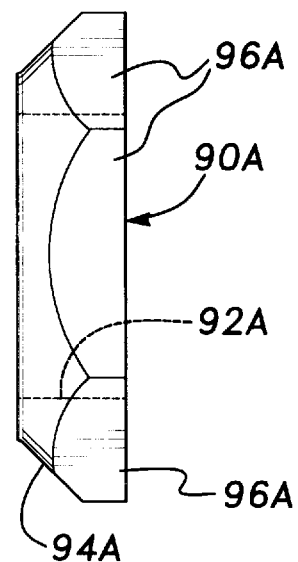
FIG. 3A is an elevational view of a modified form of the retention nut shown in FIG. 3.
Figure 4:
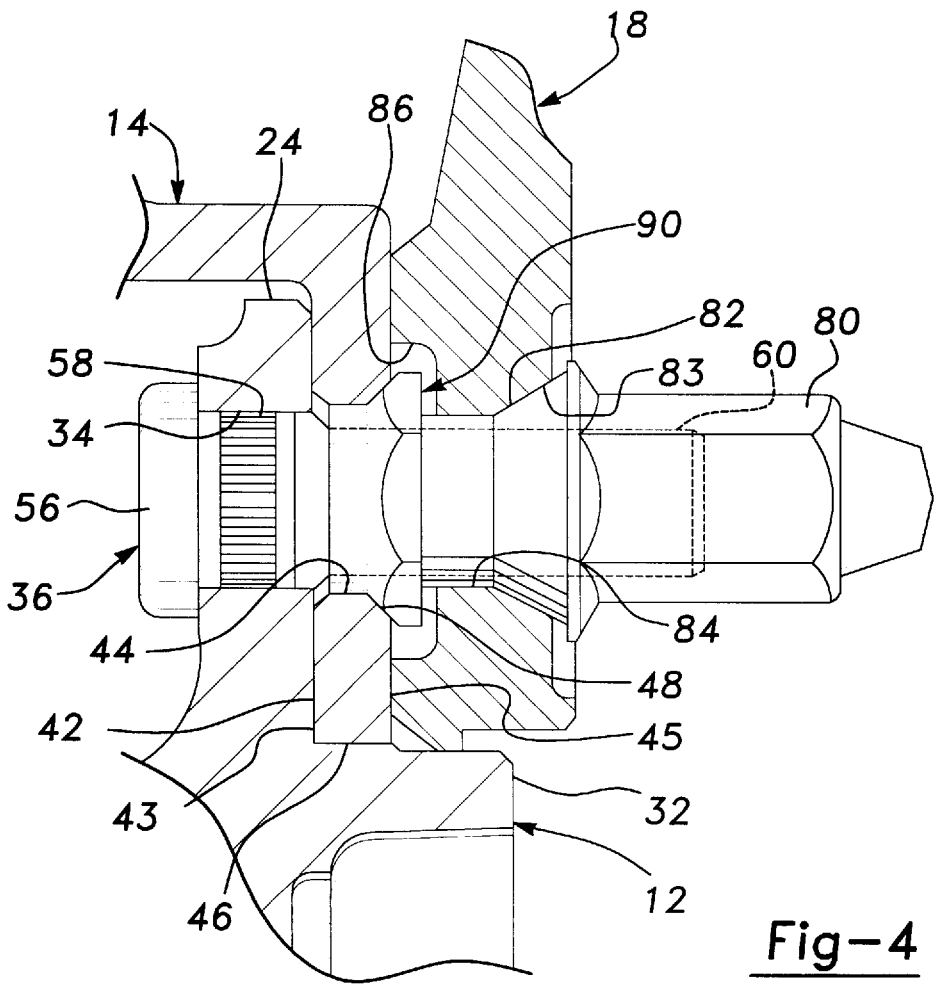
FIG. 4 is an enlarged partial cross-sectional view taken from FIG. 1.

FIG. 3A illustrates a modified embodiment of nut 90 in which the cylindrical extension of nut 90 has been removed. This embodiment provides a lower profile configuration which may be desired where tight packaging constraints exists. Elements of retention nut 90A similar to those of retention 90 are identified in FIG. 3A with the suffix "A" added.

In a preferred manufacturing process, rotor 14 is placed onto hub 12 with wheel mounting bolts 36 pressed into position. A number of retention nuts 90 are threaded onto bolts 36. In some instances, retention nuts 90 may not be required for each wheel mounting bolt which are typically five or six in number. For example, three nuts 90 may provide adequate clamping and alignment. The action of threading retention nuts 90 places a clamping load against the rotor and further accurately positions these two parts both radially (ie. center-to-center) and rotationally. Retention nuts 90 are left in position until the assembly is loaded onto the vehicle. Preferably during machining of braking surfaces 50 and 52, hub 12 is located either with respect to the inside diameter of splined diameter 26 or hub outer diameter 28. Shoulder 30 locates the components in the inboard/outboard direction. Hub 12 and rotor 14 are rotated and a machine tool, such as a single point tool or an abrasive wheel is brought into contact with the braking surfaces to form their final shape. After processing, the cartridge wheel bearing assembly 16 can be pressed onto hub barrel section outer diameter 78. Finally, wheel 18 can be mounted in position with lug nuts 80.

Figure 5:
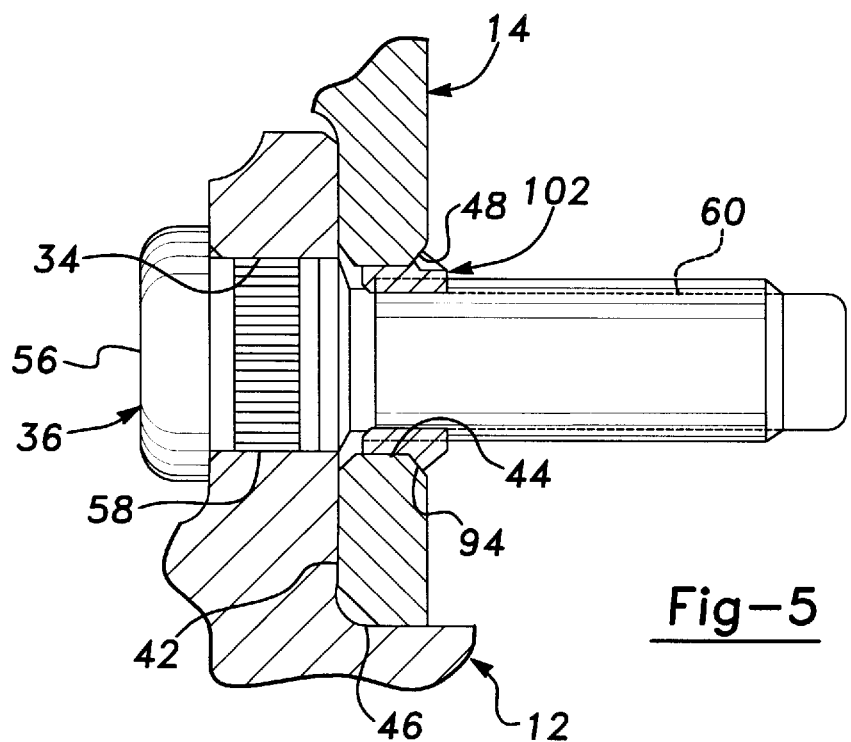
FIG. 5 is a partial cross-sectional view of a wheel end assembly of this invention showing a retention nut in accordance with a third embodiment of this invention shown threaded to a wheel mounting bolt and retaining a brake rotor to a hub.
Figure 6:
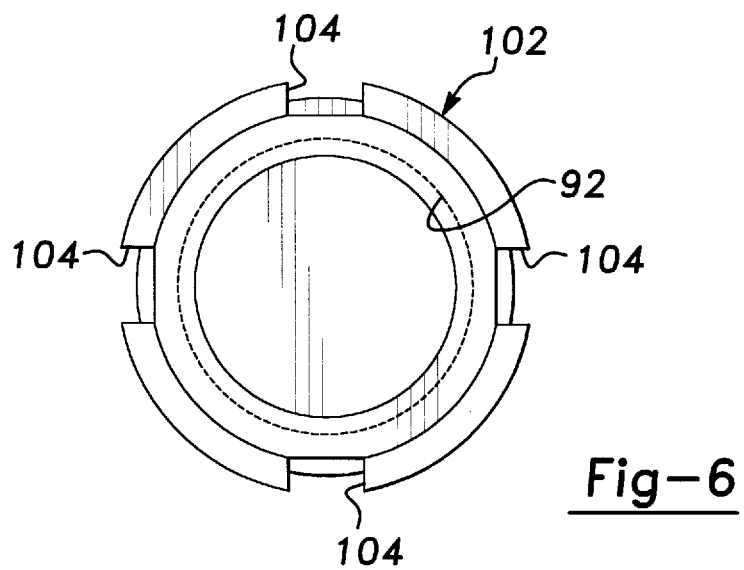
FIG. 6 is a front elevational view of the retention nut shown in FIG. 5.

A third embodiment of retention nut 102 is shown with reference to FIGS. 5 and 6. Retention nut 102 includes a number of features identical to that of retention nuts 90 and 90A including internally threaded bore 92 and conical shoulder 94. The means for rotationally driving retention nut 102 however varies in that it does not use hexagonal surfaces, but rather has diametrically opposed drive slots 104. Drive slots 104 are engaged by a spanner wrench (not shown) to tightened and loosen them as needed. In other respects, use of retention nut 102 proceeds as described previously in connection with retention nuts 90 and 90A.

Figure 7:
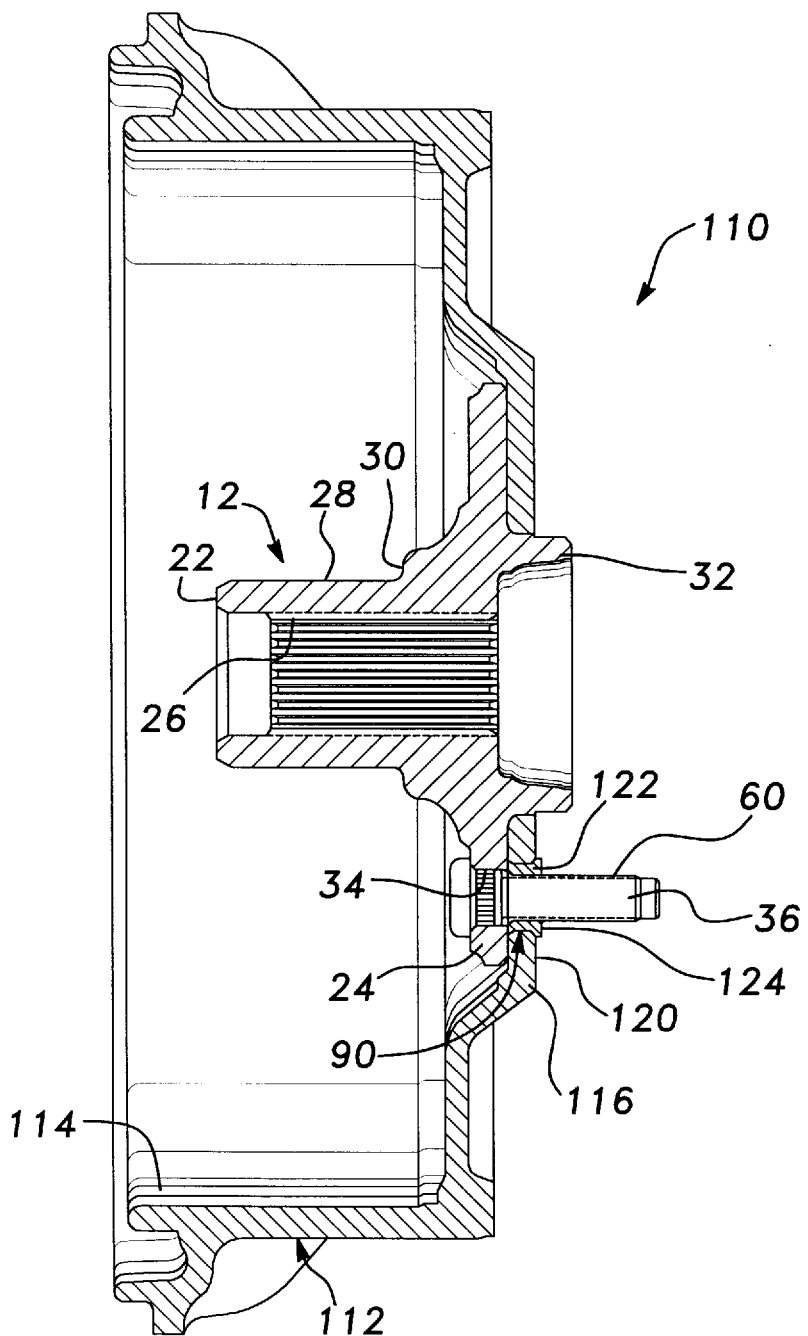
FIG. 7 is a cross-sectional view of a brake drum and rotor assembly in accordance with an alternate embodiment of this invention.

An alternate embodiment of this invention is illustrated in FIG. 7 in which drum brake and hub assembly 110 is shown. FIG. 7 illustrates that features of the subject invention can be implemented in a drum brake system. A number of components of the assembly 110 shown in FIG. 7 are, for purposes of illustration, identical to those previously described. For example, hub 12 is an identical component in both embodiments, and features of which are designated by like reference numbers. Wheel mounting bolts 36 are also identical to that previously described.

Brake drum 112 includes an inside cylindrical braking surface 114. The center surface of brake drum 112 defines mounting flange 116 having an inboard surface 118 and an outboard surface 120. Bolt clearance holes 122 included a tapered counter-bore surface 124. Thus, with the exception of the braking surfaces, the center section of brake drum 112 is identical in all significant features with that of brake rotor 14. Brake drum and hub assembly 110 also incorporate retention nuts 90 or 90A which engage with mounting flange tapered counter-bore 124 in the identical manner that they engage with similar features in the prior embodiment. As in the case of the prior embodiment, this configuration provides enhanced control over the location and control over the braking surface of the brake drum.

It is to be understood that the invention is not limited to the exact construction illustrated and described above, but that various changes and modifications may be made without departing from the spirit and scope of the invention as defined in the following claims.

We claim:

1. A process of machining the braking surfaces of a brake component comprising the steps of:
   providing a wheel hub having a generally circular flange defining a plurality of wheel mounting bolt bores,
   providing a brake component having at lease one braking surface and a generally circular mounting flange having opposed inboard and outboard surfaces, said brake component flange further having a plurality of bolt clearance bores, said brake component mounting flange bolt clearance bores further forming generally conical surfaces extending to said mounting flange outboard surface,
   providing a plurality of wheel mounting bolts each having a first section adapted to be received within said hub bolt bores and having a second section defining threads,
   providing at least two retention nuts each having an internal threaded bore and an external generally conical shoulder,
   pressing said wheel mounting bolts into said hub bolt bores such that said first section is received by said bolt bores,
   placing said brake component onto said hub such that said brake component mounting flange inboard surface engages said hub and said hub bolt clearance bores receive said bolts,
   placing each of said retention nuts onto said wheel mounting bolts such that said nut generally conical shoulder engages said brake component bolt bore generally conical surfaces to thereby clamp said brake component to said hub and establish the relative angular position and center to center alignment of said hub and brake component,
   rotating said hub and said brake component as an assembly, and
   machining said braking surfaces simultaneous with said rotating step.

2. The process of machining the braking surface of a brake component according to claim 1 further comprising the steps of:
   providing said hub with a cylindrical outer diameter surface and locating said hub during said rotating step by engaging said hub cylindrical outer diameter surface.

3. The process of machining the braking surface of a brake component according to claim 1 further comprising the steps of:
   providing a wheel bearing assembly having a race forming an inside diameter,
   placing said hub cylindrical section within said wheel bearing inside diameter.

4. The process of machining the braking surface of a brake component according to claim 1 further comprising the steps of:
   providing a vehicle wheel having a plurality of wheel mounting bolt clearance holes,
   providing a plurality of lug nuts,
   placing said wheel against said brake component in engagement with said brake component outboard surface with said bolts passing through said bolt clearance holes,
   threading said lug nuts onto said bolts thereby clamping said wheel against said brake component.

5. The process of machining the braking surface of a brake component according to claim 1 further comprising the steps of:
   proving said retention nut with a rotational driving surface, and
   driving said driving surface to thread said retention nut onto said bolt and forcibly engaging said brake component.

6. The process of machining the braking surface of a brake component rotor according to claim 1 wherein said placing step comprises threading of said retention nuts onto said bolts.

* * * * *

UNITED STATES PATENT AND TRADEMARK OFFICE
CERTIFICATE OF CORRECTION

PATENT NO. : 5,884,980
DATED : March 23, 1999
INVENTOR(S) : Visser, et al

It is certified that error appears in the above-indentified patent and that said Letters Patent is hereby corrected as shown below:

Claim 5, Column 6, Line 57  "proving" should read ---providing---

Signed and Sealed this

Third Day of August, 1999

Attest:

Q. TODD DICKINSON

*Attesting Officer*    *Acting Commissioner of Patents and Trademarks*